US008360871B2

(12) United States Patent
Sylla et al.

(10) Patent No.: US 8,360,871 B2
(45) Date of Patent: Jan. 29, 2013

(54) WAGERING GAME MACHINES WITH NON-VOLATILE MEMORY

(75) Inventors: Craig J. Sylla, Round Lake, IL (US); Stephen A. Canterbury, Antioch, IL (US)

(73) Assignee: WMS Gaming Inc., Waukegan, IL (US)

( * ) Notice: Subject to any disclaimer, the term of this patent is extended or adjusted under 35 U.S.C. 154(b) by 265 days.

(21) Appl. No.: 12/678,990

(22) PCT Filed: Sep. 22, 2008

(86) PCT No.: PCT/US2008/010962

§ 371 (c)(1), (2), (4) Date: Mar. 18, 2010

(87) PCT Pub. No.: WO2009/042089

PCT Pub. Date: Apr. 2, 2009

(65) Prior Publication Data

US 2010/0222135 A1 Sep. 2, 2010

Related U.S. Application Data

(60) Provisional application No. 60/975,409, filed on Sep. 26, 2007.

(51) Int. Cl.
*A63F 9/24* (2006.01)
*G06F 17/30* (2006.01)

(52) U.S. Cl. .................... 463/29; 463/43; 726/1; 726/2; 726/26; 726/27

(58) Field of Classification Search .................... 463/24, 463/25, 29, 42, 43; 726/1, 2, 3, 26, 27; 711/5, 711/103, 104; 713/2, 155, 164–167, 300, 713/320, 321, 323, 324, 340; 365/148, 226, 365/227, 230.03

See application file for complete search history.

(56) References Cited

U.S. PATENT DOCUMENTS 5,428,566 A * 6/1995 Robinson ........................ 365/63

(Continued)

FOREIGN PATENT DOCUMENTS

WO WO-2004025655 A2 3/2004
WO WO-2005050578 A1 6/2005

(Continued)

OTHER PUBLICATIONS

"International Application Serial No. PCT/US2008/010962 Search Report mailed Dec. 2, 2008", 4 pgs.

(Continued)

*Primary Examiner* — Damon Pierce

(74) *Attorney, Agent, or Firm* — Schwegman Lundberg & Woessner, P.A.

(57) ABSTRACT

Apparatus, systems, and methods may operate to load a software program which, when executed by a processor, is associated with presenting a wagering game upon which monetary value may be wagered. The software program may be loaded into a non-volatile memory in the form of phase-change random access memory, nanotube random access memory, or a combination thereof, and executed by the processor to present the wagering game after conducting a first preliminary authentication. Upon entering a reset cycle, a subsequent preliminary authentication of the software program is conducted without reloading the non-volatile memory, and the program is executed from the non-volatile memory by the processor while a background full authentication of the software program stored in mass storage is conducted. Execution out of the non-volatile memory is halted if the background full authentication fails.

20 Claims, 5 Drawing Sheets

U.S. PATENT DOCUMENTS

| | | | |
|---|---|---|---|
| 5,707,286 | A | 1/1998 | Carlson |
| 6,210,274 | B1 | 4/2001 | Carlson |
| 6,428,413 | B1 | 8/2002 | Carlson |
| 6,804,763 | B1 | 10/2004 | Stockdale et al. |
| 6,866,581 | B2 | 3/2005 | Martinek et al. |
| 6,935,946 | B2 | 8/2005 | Yoseloff et al. |
| 7,108,605 | B2 | 9/2006 | LeMay et al. |
| 7,111,141 | B2 | 9/2006 | Nelson |
| 7,137,893 | B2 | 11/2006 | Canterbury |
| 7,549,066 | B2 * | 6/2009 | Haid et al. .................... 713/320 |
| 2001/0053712 | A1 | 12/2001 | Yoseloff et al. |
| 2002/0052230 | A1 | 5/2002 | Martinek et al. |
| 2002/0137217 | A1 * | 9/2002 | Rowe .............................. 436/42 |
| 2003/0064808 | A1 | 4/2003 | Hecht |
| 2003/0195033 | A1 | 10/2003 | Gazdic et al. |
| 2003/0204664 | A1 | 10/2003 | Bennett et al. |
| 2004/0038740 | A1 | 2/2004 | Muir |
| 2004/0248646 | A1 | 12/2004 | Canterbury |
| 2005/0043094 | A1 | 2/2005 | Nguyen et al. |
| 2005/0054445 | A1 | 3/2005 | Gatto et al. |
| 2005/0209006 | A1 | 9/2005 | Gatto |
| 2005/0209007 | A1 | 9/2005 | Gatto |
| 2005/0215325 | A1 | 9/2005 | Nguyen et al. |
| 2005/0221898 | A1 | 10/2005 | Gatto |
| 2005/0261058 | A1 | 11/2005 | Nguyen et al. |
| 2005/0282637 | A1 | 12/2005 | Gatto et al. |
| 2006/0116208 | A1 | 6/2006 | Chen et al. |
| 2006/0205513 | A1 | 9/2006 | Breckner et al. |
| 2006/0205514 | A1 | 9/2006 | Cockerille et al. |
| 2006/0205515 | A1 | 9/2006 | Cockerille et al. |
| 2006/0287108 | A1 | 12/2006 | Canterbury |
| 2006/0287109 | A1 | 12/2006 | Mercado et al. |
| 2007/0004501 | A1 | 1/2007 | Brewer et al. |
| 2007/0050852 | A1 | 3/2007 | Yoshii et al. |
| 2007/0174581 | A1 | 7/2007 | Nelson |

FOREIGN PATENT DOCUMENTS

| | | | |
|---|---|---|---|
| WO | WO-2006002084 | A1 | 1/2006 |
| WO | WO-2006033992 | A2 | 3/2006 |
| WO | WO-2006039556 | A2 | 4/2006 |
| WO | WO-2007021506 | A1 | 2/2007 |

OTHER PUBLICATIONS

"International Application Serial No. PCT/US2008/010962 Written Opinion mailed Dec. 2, 2008", 9 pgs.

"Morphing Memory", *Science news online*, vol. 167, (Jun. 4, 2005), 12 pgs.

* cited by examiner

WAGERING GAME MACHINES WITH NON-VOLATILE MEMORY

RELATED APPLICATION

This patent application is a U.S. National Stage Filing under 35 U.S.C. 371 from International Patent Application Serial No. PCT/US2008/010962, filed Sep. 22, 2008, and published on Apr. 2, 2009, as WO 2009/042089 A1, which claims the priority benefit of U.S. Provisional Patent Application Ser. No. 60/975,409 filed Sep. 26, 2007 and entitled "WAGERING GAME MACHINES WITH NON-VOLATILE MEMORY", the contents of which are incorporated herein by reference in their entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2007, 2008 WMS Gaming, Inc.

BACKGROUND

Today's wagering game machine typically comprises a computerized system controlling a video display and/or reels to present wagering games such as slots, video card games (poker, blackjack etc.), video keno, video bingo, video pachinko and other games available in the gaming industry. Wagering game machines may form part of a wagering game network of machines and servers. In conventional systems, the software controlling the computerized system has been primarily proprietary software, including both the operating system and gaming software.

BRIEF DESCRIPTION OF THE FIGURES

Embodiments of the invention are illustrated by way of example and not limitation in the Figures of the accompanying drawings in which.

DESCRIPTION OF THE EMBODIMENTS

Example Operating Environment

Example Wagering Game Machine Architecture

The inventors have discovered that some persons seeking to engage in wagering game play become bored and turn to other pursuits when they are made to wait for games to boot up on a wagering game machine. The inventors have also discovered that revenue generated per machine can be increased if players are permitted to access the machine more quickly after power is applied. Finally, the inventors have discovered that certain types of non-volatile memory can be used in various ways to decrease the time between machine power-up and the initiation of game play.

This non-volatile memory takes the form of phase-change random access memory (PCRAM), nanotube random access memory (NRAM), and combinations thereof. For the purposes of this document, "non-volatile memory" means memory that does not need power, such as power supplied by a battery or power supply, to retain stored memory content. "PCRAM" is non-volatile RAM that stores information using at least one substance characterized by a change in resistance when it changes phase states (e.g., chalcogenide, which can be placed in crystalline and amorphous states, using the application of heat.). "NRAM" is non-volatile RAM that stores information using nanotube switching elements, including carbon nanotube switching elements.

Software programs associated with the presentation of a wagering game, including the entire wagering game program itself (or portions thereof), may be stored in this non-volatile memory without alteration across reset cycles of an apparatus, such as a wagering game machine. Upon apparatus or processor reset, and after a preliminary authentication of the program(s) in the non-volatile memory, the presentation of the wagering game can proceed while a full authentication of the same software is conducted in the background. If the full authentication fails for any reason, the presentation of the wagering game (and execution of the software out of the non-volatile memory) is halted. Various embodiments of this invention will be described in combination with the figures in further detail below.

Figure 1:
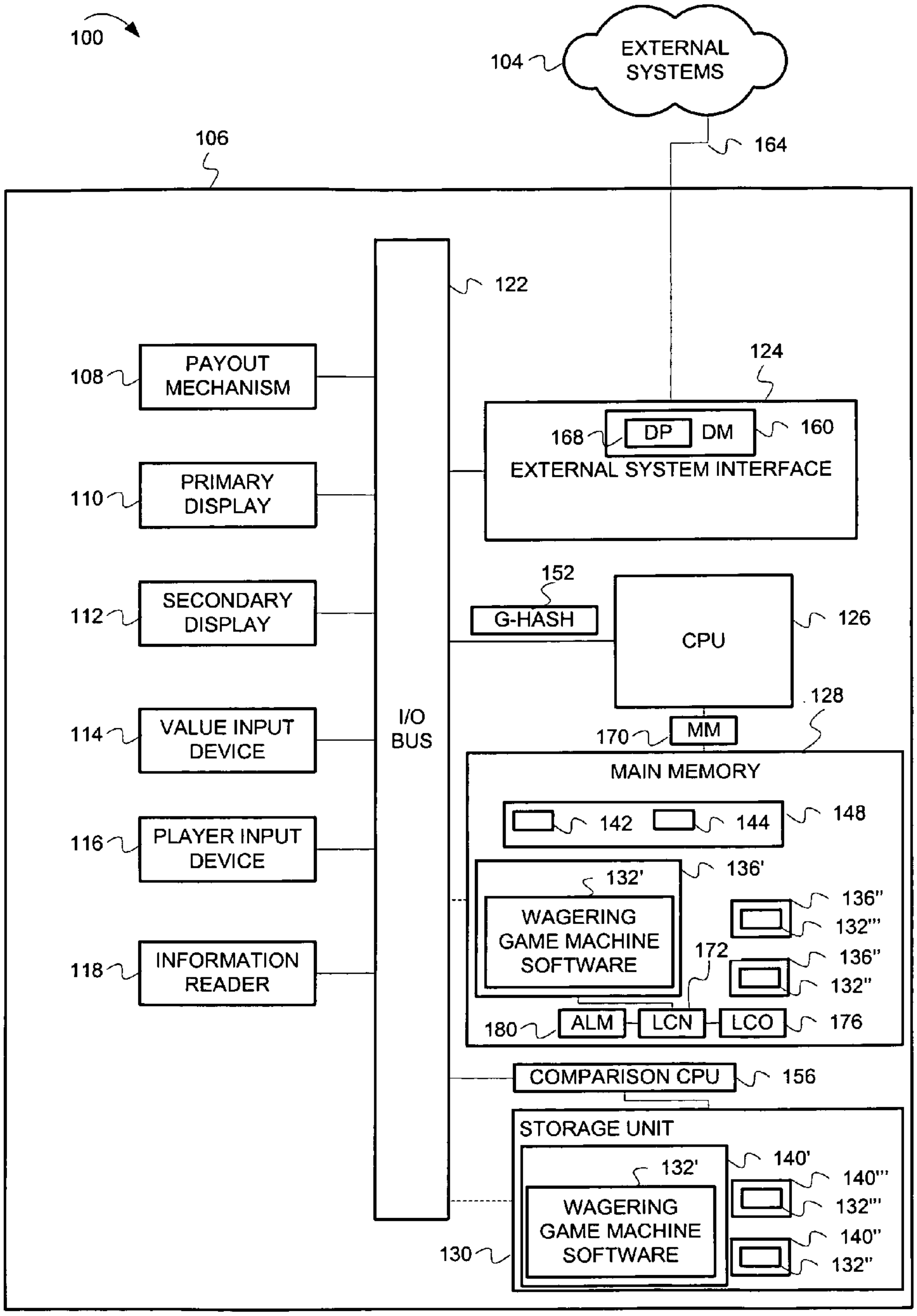
FIG. 1 is a block diagram illustrating a wagering game machine architecture according to various embodiments of the invention.

FIG. 1 is a block diagram illustrating a wagering game machine architecture 100 according to various embodiments of the invention. As shown in FIG. 1, an apparatus 106, such as a wagering game machine, includes a central processing unit (CPU) 126 connected to main memory 128, which includes wagering game machine software 132. In one embodiment, the wagering game machine software 132 is associated with the presentation of a wagering game, and when executed, can be used to present wagering games upon which monetary value may be wagered. Such games include video poker, video black jack, video slots, video lottery, etc.

The wagering game machine software 132 may be stored in a main memory 128, which may take the form, in whole or in part, of non-volatile memory 136. The non-volatile memory 136 may take the form, in whole or in part, of PCRAM, NRAM, and combinations of these.

The wagering game machine software 132 may also be stored in a mass storage unit 130, which may comprise one or more mass storage devices 140, including a disk drive, such as a hard disk drive or an optical disc drive (e.g., a compact disc, read-only memory disc drive), a flash memory drive, or some combination of these.

The CPU 126 is also connected to an input/output (I/O) bus 122, which facilitates communication between the components of the apparatus 106. The I/O bus 122 is connected to a payout mechanism 108, primary display 110, secondary display 112, value input device 114, player input device 116, information reader 118, and storage unit 130. The player input device 116 can include the value input device 114 to the extent the player input device 116 is used to place wagers. The I/O bus 122 is also connected to an external system interface 124, which is connected to external systems 104 (e.g., wired and wireless wagering game networks). The external system interface may comprise a network interface card for use with wired networks, and/or a wireless transceiver that enables the apparatus 106 to communicate with wireless networks. Thus, the apparatus 106 may comprise a portable wagering game machine having a wireless transceiver (e.g., see FIG. 5).

In one embodiment, the apparatus 106 can include additional peripheral devices and/or more than one of each component shown in FIG. 1. For example, in one embodiment, the apparatus 106 can include multiple external system interfaces 124 and multiple processors 126. In one embodiment, any of the components can be integrated or subdivided. Additionally, in one embodiment, the components of the apparatus 106 can be interconnected according to any suitable interconnection architecture (e.g., directly connected, serially connected, hypercube, etc.).

In one embodiment, any of the components of the apparatus 106 can include hardware, firmware, and/or software for performing the operations described herein. Machine-readable media includes any mechanism that provides (e.g., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory drives, etc. Machine-readable media also includes any media suitable for transmitting software over a network. Thus, many embodiments may be realized.

For example, an apparatus 106, such as a wagering game machine, may comprise one or more processors 126 and a software program 132 which, when executed by the processor(s) 126, is associated with presenting a wagering game upon which monetary value may be wagered.

The apparatus 106 may also include a non-volatile memory 136 in the form of PCRAM, NRAM, or some combination thereof, to store the software program 132 without alteration across reset cycles of the apparatus 106, and to provide access for execution of the software program 132 by the processor(s) 126 after a preliminary authentication of the software program 132 occurs.

In many embodiments, the apparatus 106 includes at least one mass storage device 140 to store the software program 132 and to permit full authentication of the software program 132, wherein execution of the software program by the processor(s) 126 is to be halted if the full authentication fails.

For the purposes of this document, "full authentication" means authenticating stored content in a memory so as to provide at least the same degree of confidence in the integrity of the content as can be obtained when digital signatures are generated and authenticated using the Digital Signature Standard adopted by the United States Department of Commerce, National Institute of Standards and Technology and published in FIPS PUB 186-2 on Jan. 27, 2000. "Preliminary authentication" means a process that operates to verify the content of a memory, such as a software program, providing some level of confidence in the integrity of the content, but not to the same degree as is provided by full authentication. A "reset cycle" means an event which causes volatile memory in the apparatus 106 to alter its contents, such as a processor reboot or wagering game machine power cycle operation. Readers that desire to learn more about authentication are encouraged to consult United States Patent Publication Numbers 2003/0195033 and 2004/0248646, assigned to the assignee of the instant disclosure, and incorporated herein by reference in their entirety.

A signature 142, which may or may not comprise secure hash codes 144, may be stored in a secure memory 148 (perhaps different from the non-volatile memory 136). Full authentication may comprise verifying the signature 142 and/or comparing generated hash codes 152 associated with the software program 132 and the secure hash codes 144. The preliminary authentication may be hash-based (e.g., based on a comparison of hash codes) as well.

Various security provisions may be implemented. For example, a comparison processor 156 can be used to regulate access to the mass storage device 140, such that the mass storage device 140 can be accessed by the comparison processor 156, which is different from the processor(s) 126 used to execute the software program 132.

In some embodiments, the mass storage device 140 cannot be directly accessed by the processor(s) 126. Thus, separate circuitry and/or software (e.g., the comparison processor 156) can be maintained to conduct the full authentication process. Readers that desire to learn more about such security measures are encouraged to consult United States Patent Publication 2004/0248646, mentioned above.

Other embodiments may be realized. For example, an apparatus 106 may comprise one or more processors 126 and a software program 132 as described above. In various embodiments, the apparatus 106 includes a non-volatile memory 136 in the form of PCRAM, NRAM, or a combination thereof, to store the software program 132 received once from an external system 104, such as a network. After being received once, the software program 132 is operable without alteration across reset cycles of the apparatus 106 to permit execution by the processor(s) 126 after authentication of the software program 132 occurs. In some embodiments, the memory 136 is used to store a plurality of executable wagering game programs, including the software program 132.

The apparatus 106 may also include a download module 160 to manage reception from the external system 104 of the software program 132. The download module 160 may be configured to manage storage in the non-volatile memory 136 of the software program 132. The download module 160 may include a download processor 168 different from the at least one processor.

Using the structure shown in FIG. 1, the software program 132 may be executed across repeated reset cycles of the apparatus 106 after being downloaded one time to the non-volatile memory 136. Authentication of the software program 132 in the non-volatile memory may comprise a full authentication or a preliminary authentication. Therefore, in some embodiments, the processor(s) 126 may not be permitted to access the non-volatile memory 136 until authentication is complete.

In some embodiments, the mass storage 140 is accessible using a network connection 164, and the software program 132 can be reloaded to the mass storage device 140 after a reset cycle occurs, if desired. Preliminary authentication in the non-volatile memory 136 may be followed by full authentication in the mass storage device 140 while the software program 132 is executed by the processor(s) 126 out of the non-volatile memory 136. In some embodiments, the time period during which authentication is conducted overlaps the time period during which the software program 132 is received from the network (e.g., preliminary or full authentication of the software program 132 may begin prior to the time that all of the software program 132 is received and stored in the memory 136).

Many other embodiments may be realized. For example, in some instances, an apparatus 106, such as a wagering game machine, operates to execute multiple software programs 132, including game programs, stored in separately powered NRAM and/or PCRAM sections. For example, three executable software programs 132', 132'', 132''' can be stored in corresponding memories 136', 136'', 136'''. Similar, the software programs can be stored in three mass storage devices 140', 140'', 140'''.

Thus, an apparatus 106 may comprise one or more processors 126 and a plurality of software programs 132', 132'', 132''' executable by the processor(s) 126 and stored in corresponding, individually-powered memory sections 136', 136'', 136''. When power is applied to selected sections, the processor(s) 126 can access selected ones of the plurality of software programs 132', 132'', 132'''. Different amounts of granularity can be employed, such that each section 136', 136'', 136''' is used to store a complete game, or perhaps a single game is divided into portions that are stored separately in the various sections 136', 136'', 136''.

Having a plurality of memory sections 136', 136'', 136''' permits the realization of still further embodiments. For example, in some embodiments, the processor(s) 126 may be prevented from accessing an individual section 136', 136'', 136''' until the software program stored in that section has been authenticated. It may also be the case that as authentication proceeds through the sections 136', 136'', 136''', the processor(s) 126 may access sections in the order that authentication is completed. The sections 136', 136'', 136''' may comprise portions of a single chip, memory card, and/or one or more separate circuit boards coupled to a motherboard and banks of memory. To save power, selected ones of the sections 136', 136'', 136''' can be powered-down if they are not accessed within a predetermined amount of time. For example, the predetermined amount of time may be a designated number of processor cycles associated with the processor 126.

In some embodiments, the apparatus 106 comprises a separate memory management module 170 to prevent access to more than one of the sections 136', 136'', 136''' at a time by the processor 126. The memory management module 170 may be placed in-between the processor(s) 126 and the sections 136', 136'', 136''' as shown in FIG. 1. However, the module 170 may also form part of the memory 128, or be coupled between the memory 128 and the bus 122 to facilitate communications between the memory 128 and other devices. In some cases, the memory management module 170 may be used to permit downloading a plurality of software programs into respective sections 136', 136'', 136''' substantially simultaneously.

In some embodiments, the apparatus 106 comprises a lifetime counter 172 to count storage cycles with respect to the non-volatile memory 136. The apparatus 106 may also comprise a lifetime comparator 176 coupled to the lifetime counter 172. The lifetime comparator 176 can be used to compare a usage lifetime value (e.g., 20,000 storage cycles) with a current value of the lifetime counter. An alarm 180 may be coupled to the lifetime counter 172 or the comparator 176 to indicate when a desired number of cycles has been reached. This indication can be used to alert owners of the apparatus 106 that maintenance, repair, or replacement of the memory 136 is imminent. The indication may also be used separately, or in conjunction with the comparison processor 156 and/or memory management module 170 to control access to the sections 136', 136'', 136''.

Figure 2:
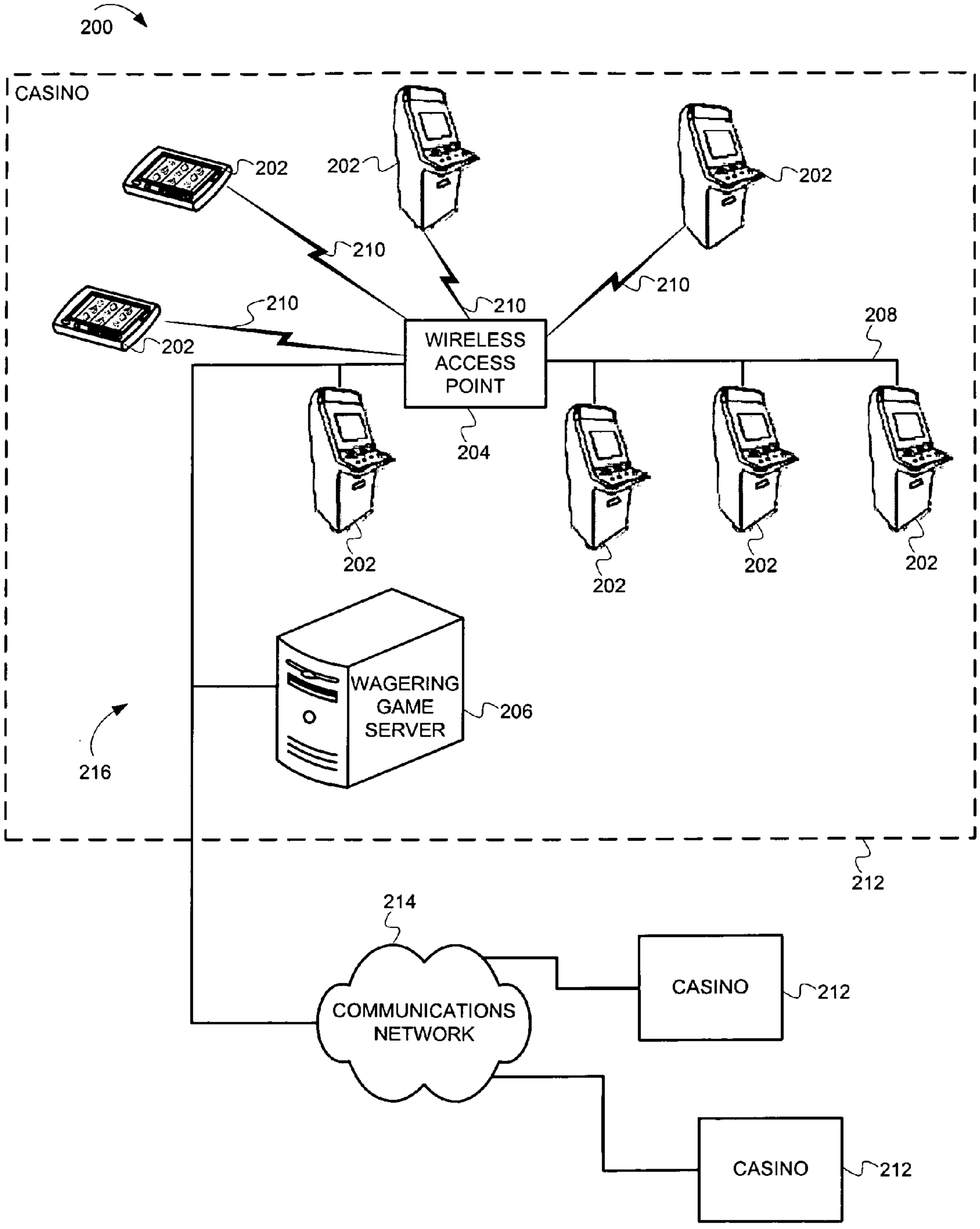
FIG. 2 is a block diagram illustrating a wagering game network, according to various embodiments of the invention.

While FIG. 1 describes several embodiments of a wagering game machine architecture, FIG. 2 shows how a plurality of wagering game machines can be connected in a wagering game network.

Example Wagering Game Network

FIG. 2 is a block diagram illustrating a wagering game network 200, according to various embodiments of the invention. As shown in FIG. 2, the wagering game network 200 includes a plurality of casinos 212 connected to a communications network 214.

Each of the plurality of casinos 212 includes a local area network 216, which may include a wireless access point 204, wagering game machines 202, and a wagering game server 206 that can serve wagering games over the local area network 216. As such, the local area network 216 includes wireless communication links 210 and wired communication links 208. The wired and wireless communication links can employ any suitable connection technology, such as Bluetooth, 802.11, Ethernet, public switched telephone networks, SONET, etc. In one embodiment, the wagering game server 206 can serve wagering games and/or distribute content to devices located in other casinos 212 or at other locations on the communications network 214.

The wagering game machines 202 and wagering game server 206 can include hardware and machine-readable media including instructions for performing the operations described herein. The wagering game machines 202 may be similar to or identical to the apparatus 106 shown in FIG. 1.

The wagering game machines 202 described herein can take any suitable form, such as floor standing models, handheld mobile units, bartop models, workstation-type console models, etc. Further, the wagering game machines 202 can be primarily dedicated for use in conducting wagering games, or can include non-dedicated devices, such as mobile phones, personal digital assistants, personal computers, etc. In one embodiment, the wagering game network 200 can include other network devices, such as accounting servers, wide area progressive servers, and player tracking servers.

In various embodiments, wagering game machines 202 and wagering game servers 206 work together such that a wagering game machine 202 may be operated as a thin, thick, or intermediate client. For example, one or more elements of game play may be controlled by the wagering game machine 202 (client) or the wagering game server 206 (server). Game play elements may include executable game code, lookup tables, configuration files, game outcome, audio or visual representations of the game, game assets or the like. In a thin-client example, the wagering game server 206 may perform functions such as determining game outcome or managing assets, while the wagering game machine 202 may be used merely to present the graphical representation of such outcome or asset modification to the user (e.g., player). In a thick-client example, game outcome may be determined locally (e.g., at the wagering game machine 202) and then communicated to the wagering game server 206 for recording or managing a player's account.

Similarly, functionality not directly related to game play may be controlled by the wagering game machine 202 (client) or the wagering game server 206 (server) in some embodiments. For example, power conservation controls that manage a display screen's light intensity may be managed centrally (e.g., by the wagering game server 206) or locally (e.g., by the wagering game machine 202). Other functionality not directly related to game play may include presentation of advertising, software or firmware updates, system quality or security checks, etc.

Example Operations

Figure 3:
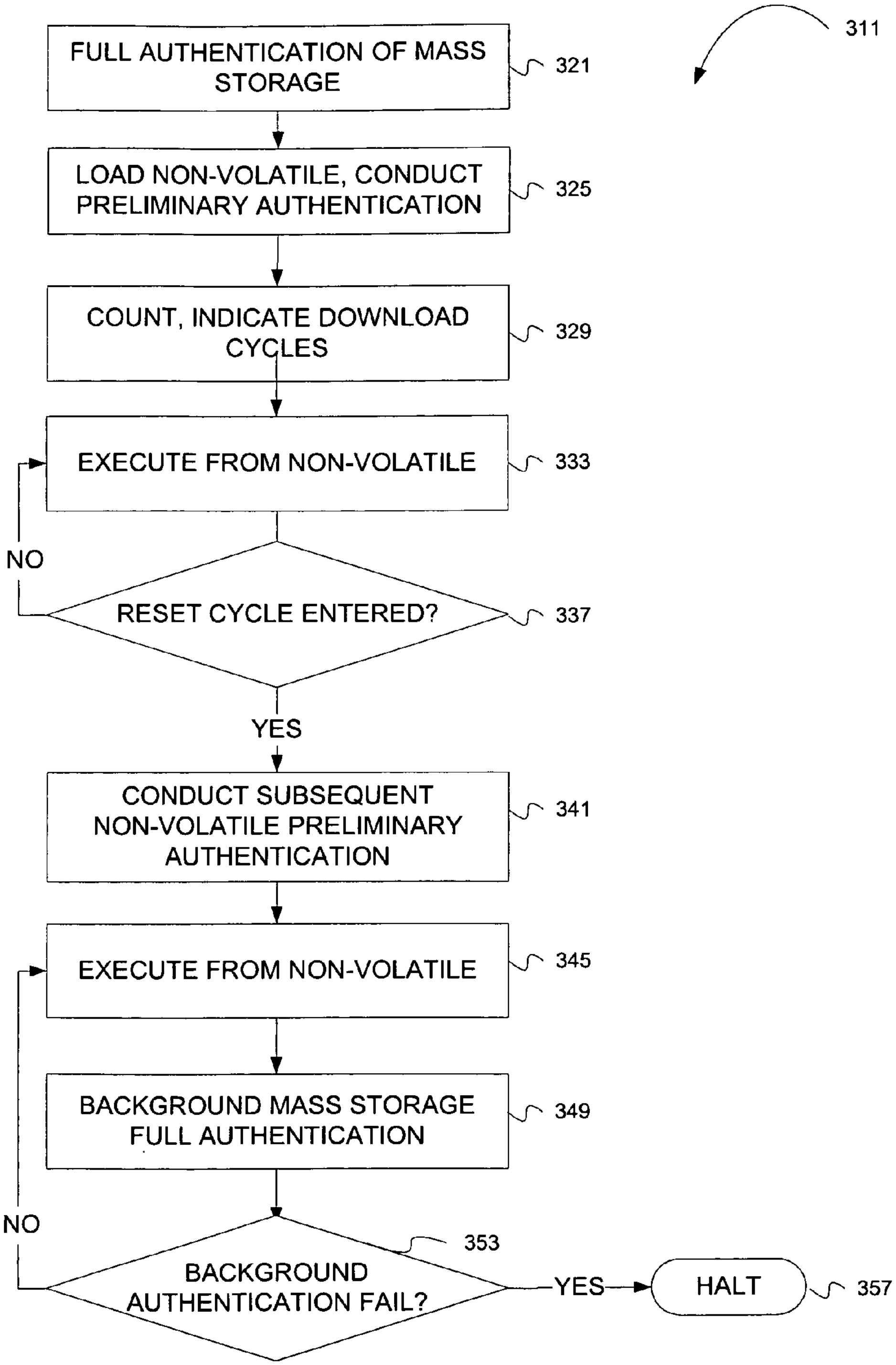
FIG. 3 is a flow chart illustrating methods according to various embodiments of the invention.

FIG. 3 is a flow chart illustrating methods 311 according to various embodiments of the invention. In some embodiments, a method 311 that utilizes non-volatile memory to speed up access to wagering game machine operations begins at block 321 with conducting a full authentication of a software program stored in mass storage which, when executed by a processor, is associated with presenting a wagering game upon which monetary value may be wagered.

The method 311 may continue at block 325 with loading the software program into a non-volatile memory in the form of phase-change random access memory, nanotube random access memory, or a combination thereof. Loading at block 325 may comprise downloading the software program to the non-volatile memory while preventing access to the non-volatile memory by the executing processor.

In some embodiments, the loading at block 325 may comprise downloading the software program as part of a plurality of software programs, wherein each one of the plurality of software programs is downloaded to a selected one of corresponding sections of the non-volatile memory. In some embodiments, the wagering game machine including the processor is coupled to mass storage located outside of the wagering game machine using a network.

The method 311 may continue at block 329 with counting the number of download cycles associated with the non-volatile memory, as they occur, and indicating when the number of counted cycles is approximately equal to a selected or pre-calculated number of download cycles. Thus, the number of selected or pre-calculated download cycles might be the number of storage cycles for which the non-volatile memory can be used before replacement is recommended. For example, if there is a limit imposed with respect to the number of total storage cycles for a particular type of non-volatile memory, perhaps according to the memory technology, the number of actual storage cycles can be tracked against a selected/pre-calculated value to maintain system integrity (e.g., if the number of counted/actual storage cycles reaches 10,000, then the memory might be scheduled for replacement based on known failure probability rates that sharply increase after 12,000 cycles).

The non-volatile memory may also be used until the number of detected errors, either a total number, or number detected per time interval or number of storage cycles, reaches a pre-selected value. System operation might then be halted at that point.

The method 311 may continue at block 333 with executing the software program from the non-volatile memory by the processor to present the wagering game (after conducting a first preliminary authentication of the software program in the non-volatile memory—see block 325). If a reset cycle has not been entered by the processor, as determined at block 337, then the method 311 may continue with execution at block 333.

If, as determined at block 337, at least one reset cycle has been entered by the processor, a subsequent preliminary authentication of the software program in the non-volatile memory is conducted in response, at block 341, without reloading the software program into the non-volatile memory. While many options exist, one of them includes conducting the subsequent preliminary authentication by comparing a hash value associated with the software program stored in the non-volatile memory with a hash value stored in a secure memory. Another includes conducting the subsequent preliminary authentication using a comparison processor different from the processor that executes the software program out of non-volatile memory.

The method 311 may go on to block 345, with executing the software program from the non-volatile memory by the processor to present the wagering game. In some cases, conducting the subsequent preliminary authentication at block 341 comprises conducting the subsequent preliminary authentication prior to executing the software program at block 345. In some cases, conducting the subsequent preliminary authentication at block 341 comprises substantially simultaneously conducting the subsequent preliminary authentication while a portion of the execution of the software program at block 345 occurs.

In some embodiments, power is selectively supplied to sections of the non-volatile memory to save power, or for security purposes, as noted previously. Thus, the method 311 may include refraining from applying power to all but one of the non-volatile memory sections to conduct the execution of the software program at block 345. In addition, or alternatively, the method 311 may include applying power only to the sections that have been accessed by the processor within a predetermined amount of time.

The method 311 may go on to block 349 to include conducting a background full authentication of the software program stored in mass storage while execution of the software program out of non-volatile memory at block 345 occurs. If the background authentication does not fail, as determined at block 353, then the method 311 can continue with executing the software program out of non-volatile memory at block 345, and full authentication of the software program in the background at block 349. However, if the background authentication does fail, as determined at block 353, then the method 311 goes on to halting the execution out of the non-volatile memory at block 345 at block 357. Full authentication of the software program may comprise verifying a signature in either or both of blocks 321 and 349.

It should be noted that unless specifically claimed otherwise, the methods described herein do not have to be executed in the order described, or in any particular order. Moreover, various activities described with respect to the methods identified herein can be executed in iterative, repetitive, serial, or parallel fashion. Information, including parameters, commands, operands, and other data, can be sent and received in the form of one or more carrier waves.

Example Wagering Game Machines

Example Wagering Game Machine

Figure 4:
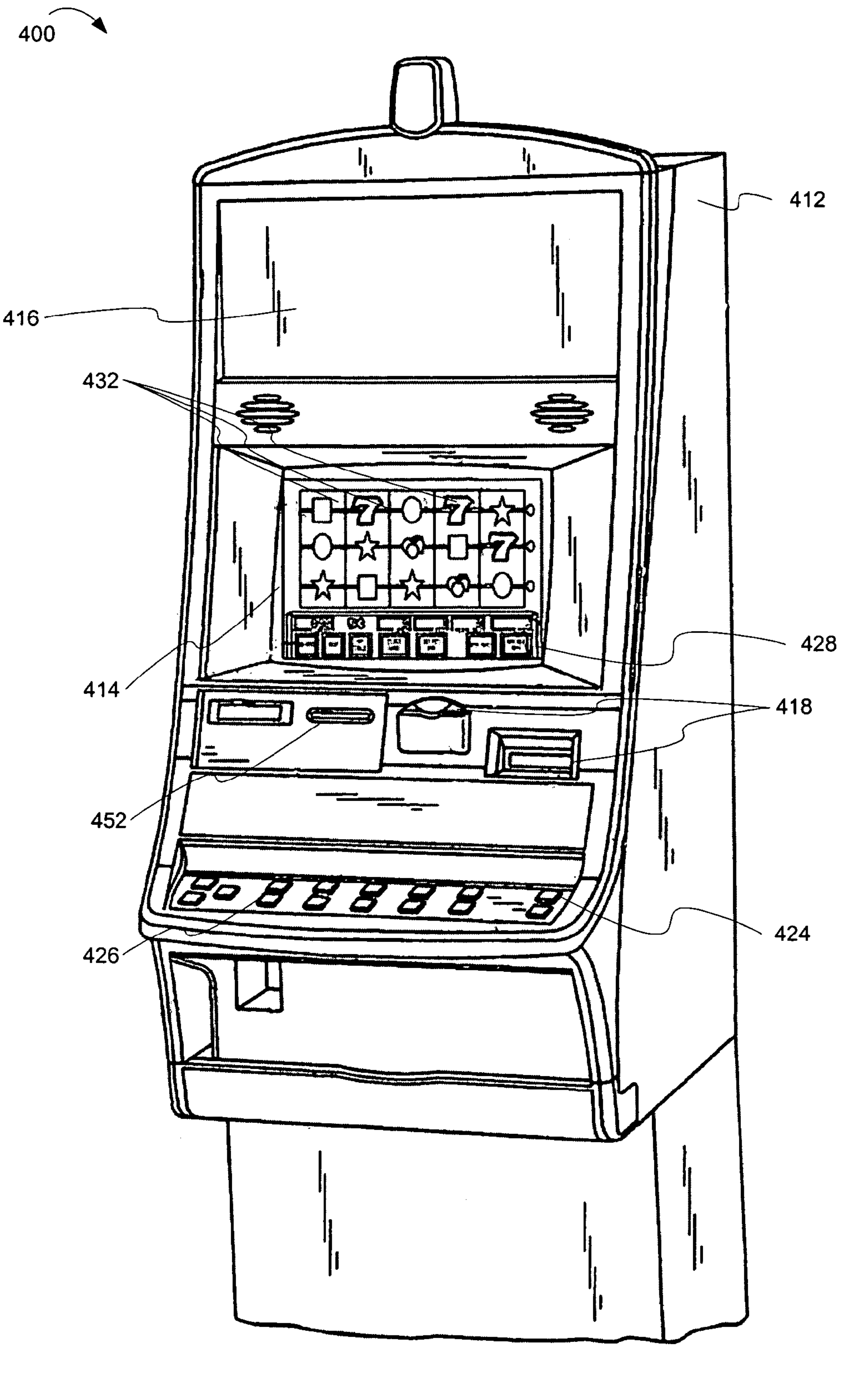
FIG. 4 is a perspective view of a wagering game machine, according to various embodiments of the invention.

FIG. 4 is a perspective view of a wagering game machine 400, according to various embodiments of the invention. Referring to FIG. 4, a wagering game machine 400 is used in gaming establishments, such as casinos. According to most embodiments, the wagering game machine 400 can be any type of wagering game machine and can have varying structures and methods of operation. For example, the wagering game machine 400 can be an electromechanical wagering game machine configured to play mechanical slots, or it can be an electronic wagering game machine configured to play video casino games, such as blackjack, slots, keno, poker, blackjack, roulette, etc. The wagering game machine 400 may be similar to or identical to the apparatus 106 of FIG. 1.

The wagering game machine 400 comprises a housing 412 and includes input devices, including value input devices 418 and a player input device 424. For output, the wagering game machine 400 includes a primary display 414 for displaying information about a basic wagering game. The primary display 414 can also display information about a bonus wagering game and a progressive wagering game. The wagering game machine 400 also includes a secondary display 416 for displaying wagering game events, wagering game outcomes, and/or signage information. While some components of the wagering game machine 400 are described herein, numerous other elements can exist and can be used in any number or combination to create varying forms of the wagering game machine 400.

The value input devices 418 can take any suitable form and can be located on the front of the housing 412. The value input devices 418 can receive currency and/or credits inserted by a player. The value input devices 418 can include coin acceptors for receiving coin currency and bill acceptors for receiving paper currency. Furthermore, the value input devices 418 can include ticket readers or barcode scanners for reading information stored on vouchers, cards, or other tangible portable storage devices. The vouchers or cards can authorize access to central accounts, which can transfer money to the wagering game machine 400.

The player input device 424 comprises a plurality of push buttons on a button panel 426 for operating the wagering game machine 400. In addition, or alternatively, the player input device 424 can comprise a touch screen 428 mounted over the primary display 414 and/or secondary display 416.

The various components of the wagering game machine 400 can be connected directly to, or contained within, the housing 412. Alternatively, some of the wagering game machine's components can be located outside of the housing 412, while being communicatively coupled with the wagering game machine 400 using any suitable wired or wireless communication technology.

The operation of the basic wagering game can be displayed to the player on the primary display 414. The primary display 414 can also display a bonus game associated with the basic wagering game. The primary display 414 can include a cathode ray tube (CRT), a high resolution liquid crystal display (LCD), a plasma display, light emitting diodes (LEDs), or any other type of display suitable for use in the wagering game machine 400. Alternatively, the primary display 414 can include a number of mechanical reels to display the outcome. In FIG. 4, the wagering game machine 400 is an "upright" version in which the primary display 414 is oriented vertically relative to the player. Alternatively, the wagering game machine can be a "slant-top" version in which the primary display 414 is slanted at about a thirty-degree angle toward the player of the wagering game machine 400. In yet another embodiment, the wagering game machine 400 can exhibit any suitable form factor, such as a free standing model, bartop model, mobile handheld model, or workstation console model.

A player begins playing a basic wagering game by making a wager via the value input device 418. The player can initiate play by using the player input device's buttons or touch screen 428. The basic game can include arranging a plurality of symbols along a payline 432, which indicates one or more outcomes of the basic game. Such outcomes can be randomly selected in response to player input. At least one of the outcomes, which can include any variation or combination of symbols, can trigger a bonus game.

In some embodiments, the wagering game machine 400 can also include an information reader 452, which can include a card reader, ticket reader, bar code scanner, RFID transceiver, or computer readable storage medium interface. In some embodiments, the information reader 452 can be used to award complimentary services, restore game assets, track player habits, etc.

Example Wagering Game Machine

Figure 5:
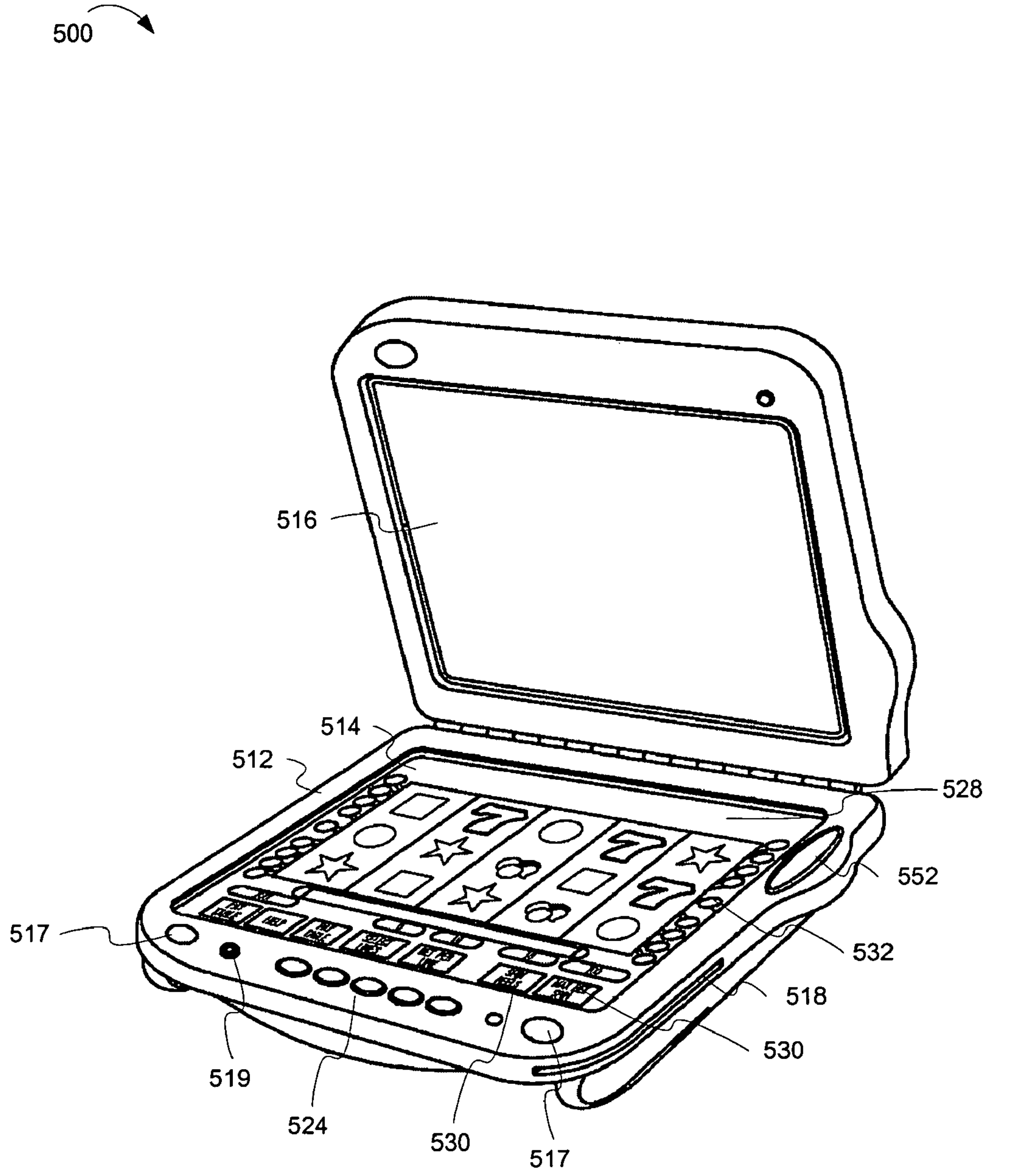
FIG. 5 is a perspective view of a portable wagering game machine, according to various embodiments of the invention.

FIG. 5 is a perspective view of a portable wagering game machine 500, according to various embodiments of the invention. Like free standing wagering game machines, in a handheld or mobile form, the wagering game machine 500 can include any suitable electronic device configured to play a video casino games such as blackjack, slots, keno, poker, blackjack, and roulette. The wagering game machine 500 may be similar to or identical to the apparatus 106 of FIG. 1.

The wagering game machine 500 comprises a housing 512 and includes input devices, including a value input device 518 and a player input device 524. For output, the wagering game machine 500 includes a primary display 514, a secondary display 516, one or more speakers 517, one or more player-accessible ports 519 (e.g., an audio output jack for headphones, a video headset jack, etc.), and other conventional I/O devices and ports, which may or may not be player-accessible. In the embodiment depicted in FIG. 5, the wagering game machine 500 comprises a secondary display 516 that is rotatable relative to the primary display 514. The optional secondary display 516 can be fixed, movable, and/or detachable/attachable relative to the primary display 514. Either the primary display 514 and/or secondary display 516 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 518 can comprise, for example, a slot located on the front, side, or top of the housing 512 configured to receive credit from a stored-value card (e.g., casino card, smart card, debit card, credit card, etc.) inserted by a player. The player-accessible value input device 518 can also comprise a sensor (e.g., an RF sensor) configured to sense a signal (e.g., an RF signal) output by a transmitter (e.g., an RF transmitter) carried by a player. The player-accessible value input device 518 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 500.

Still other player-accessible value input devices 518 can require the use of touch keys 530 on the touch-screen display (e.g., primary display 514 and/or secondary display 516) or player input devices 524. Upon entry of player identification information and, preferably, secondary authorization information (e.g., a password, PIN number, stored value card number, predefined key sequences, etc.), the player can be permitted to access a player's account. As one potential optional security feature, the wagering game machine 500 can be configured to permit a player to access only accounts the player has specifically set up for the wagering game machine 500. Other security features can also be utilized, for example, to prevent unauthorized access to a player's account, to minimize an impact of any unauthorized access to a player's account, or to prevent unauthorized access to any personal information or funds temporarily stored on the wagering game machine 500.

The player input device 524 comprises a plurality of push buttons on a button panel for operating the wagering game machine 500. In addition, or alternatively, the player input device 524 can comprise a touch screen mounted to a primary display 514 and/or secondary display 516. In one aspect, the touch screen is matched to a display screen having one or more selectable touch keys 530 selectable by a user's touching of the associated area of the screen using a finger or a tool, such as a stylus pointer. A player enables a desired function either by touching the touch screen at an appropriate touch key 530 or by pressing an appropriate push button on the button panel. The touch keys 530 can be used to implement the same functions as push buttons. Alternatively, the push buttons 532, can provide inputs for one aspect of the operating the game, while the touch keys 530 can allow for input needed for another aspect of the game. The various components of the wagering game machine 500 can be connected directly to, or contained within, the housing 512, as seen in FIG. 5, or can be located outside the housing 512 and connected to the housing 512 via a variety of wired (tethered) or wireless connection methods. Thus, the wagering game machine 500 can comprise a single unit or a plurality of interconnected (e.g., wireless connections) parts which can be arranged to suit a player's preferences.

The operation of the basic wagering game on the wagering game machine 500 is displayed to the player on the primary display 514. The primary display 514 can also display the bonus game associated with the basic wagering game. The primary display 514 preferably takes the form of a high resolution LCD, a plasma display, an LED, or any other type of display suitable for use in the wagering game machine 500. The size of the primary display 514 can vary from, for example, about a 2-3" display to a 15" or 17" display. In at least some embodiments, the primary display 514 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 514 and/or secondary display 516 can have a 15:9 aspect ratio or other aspect ratio (e.g., 4:3). The primary display 514 and/or secondary display 516 can also each have different resolutions, different color schemes, and different aspect ratios.

As with the free standing embodiments a wagering gaming machine, a player begins play of the basic wagering game on the wagering game machine 500 by making a wager (e.g., via the value input device 418 or an assignment of credits stored on the handheld gaming machine via the touch screen keys 530, player input device 524, or buttons 532) on the wagering game machine 500. In some embodiments, the basic game can comprise a plurality of symbols arranged in an array, and includes at least one payline 528 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 518 of the wagering game machine 500 can double as a player information reader 552 that allows for identification of a player by reading a card with information indicating the player's identity (e.g., reading a player's credit card, player ID card, smart card, etc.). The player information reader 552 can alternatively or also comprise a bar code scanner, RFID transceiver or computer readable storage medium interface. In one embodiment, the player information reader 552 comprises a biometric sensing device.

General

Implementing the apparatus, systems, and methods disclosed herein may increase the play time available between wagering game machine power cycle and reset events. This increased play time may translate into a greater number of satisfied game players, and additional revenue for the owners of the machines.

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Description of the Embodiments, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into this detailed description, with each claim standing on its own as a separate embodiment.

What is claimed is:

1. An apparatus, comprising:

at least one processor;

a software program which, when executed by the at least one processor, is associated with presenting a wagering game upon which monetary value may be wagered;

a non-volatile memory in the form of phase-change random access memory, nanotube random access memory, or a combination thereof, to store the software program without alteration across reset cycles of the apparatus, and to provide access for execution of the software program by the at least one processor after a preliminary authentication of the software program occurs, wherein the non-volatile memory is divided into sections corresponding to each one of a plurality of other software programs, wherein the sections are to be individually powered to access selected ones of the plurality of other software programs, wherein selected ones of the sections are powered-down when the selected ones are not accessed within a predetermined amount of time; and a mass storage device to store the software program and to permit full authentication of the software program, wherein execution of the software program by the at least one processor is to be halted if the full authentication fails;

wherein the at least one processor initiates a first execution of the software from the non-volatile memory to present the wagering game, the processor thereafter entering at least one reset cycle, and in response performing a subsequent preliminary authentication of the software program in the non-volatile memory without reloading the software program into the non-volatile memory, wherein the at least one processor initiates a second execution of the software program from the non-volatile memory to present the wagering game, the processor conducting a background full authentication of the software program stored in the mass storage while the second executing occurs.

2. The apparatus of claim 1, wherein the preliminary authentication is hash-based.

3. The apparatus of claim 1, wherein the full authentication comprises verifying a signature.

4. The apparatus of claim 1, wherein secure hash codes are stored in a secure memory different from the non-volatile memory, and the full authentication includes comparing generated hash codes associated with the software program and the secure hash codes.

5. The apparatus of claim 1, wherein the mass storage device cannot be directly accessed by the at least one processor.

6. The apparatus of claim 1, wherein the at least one processor is not permitted to access the non-volatile memory until the preliminary authentication is complete.

7. The apparatus of claim 1, wherein the non-volatile memory is to store a plurality of executable wagering game programs, including the software program.

8. The apparatus of claim 1, wherein a time period of the preliminary authentication is conducted so as to overlap a time period of reception of the software program.

9. The apparatus of claim 1, wherein the preliminary authentication is followed by the full authentication.

10. An apparatus, comprising:

at least one processor;

a plurality of software programs executable by the at least one processor, wherein each one of the plurality of software programs, when executed by the at least one processor, is associated with presenting a wagering game upon which monetary value may be wagered; and a non-volatile memory in the form of phase-change random access memory, nanotube random access memory, or a combination thereof, to store the plurality of software programs, and to provide access for execution of at least one of the software programs by the at least one processor after a preliminary authentication of the at least one software program occurs, wherein the non-volatile memory is divided into sections corresponding to each one of the plurality of software programs, and wherein the at least one processor initiates a first execution of the at least one software program from the non-volatile memory to present the wagering game, the processor thereafter entering at least one reset cycle, and in response performing a subsequent preliminary authentication of the at least one software program in the non-volatile memory without reloading the at least one software program into the non-volatile memory, wherein the at least one processor initiates a second execution of the at least one software program from the non-volatile memory to present the wagering game, the processor conducting a background full authentication of the at least one software program stored in a mass storage while the second executing occurs.

11. The apparatus of claim 10, comprising:

a memory management module to prevent access to more than one of the sections at a time by the at least one processor.

12. The apparatus of claim 11, wherein the memory management module is to permit downloading one of the plurality of software programs into the sections at the same time as another one of the plurality of software programs.

13. The apparatus of claim 10, wherein no access by the at least one processor to an individual one of the sections is permitted until one of the plurality of software programs stored in the individual one of the sections is authenticated.

14. A method, comprising:

conducting a full authentication of a software program stored in mass storage which, when executed by a processor, is associated with presenting a wagering game upon which monetary value may be wagered;

loading the software program into a non-volatile memory in the form of phase-change random access memory, nanotube random access memory, or a combination thereof, wherein the loading comprises downloading the software program as part of a plurality of software programs, wherein each one of the plurality of software programs is downloaded to a selected one of sections of the non-volatile memory;

first executing the software program from the non-volatile memory by the processor to present the wagering game after conducting a first preliminary authentication of the software program in the non-volatile memory;

entering at least one reset cycle by the processor, responsive to which a subsequent preliminary authentication of the software program in the non-volatile memory is conducted without reloading the software program into the non-volatile memory;

second executing the software program from the non-volatile memory by the processor to present the wagering game;

conducting a background full authentication of the software program stored in the mass storage while the second executing occurs; and halting the second executing if the background full authentication fails, wherein power is not supplied to the sections that have not been accessed by the processor within a predetermined amount of time.

15. The method of claim 14, wherein conducting the subsequent preliminary authentication comprises:

comparing a hash value associated with the software program stored in the non-volatile memory with a hash value stored in a secure memory.

16. The method of claim 14, wherein conducting the subsequent preliminary authentication comprises:

conducting the subsequent preliminary authentication using a comparison processor different from the processor.

17. The method of claim 14, wherein the loading comprises:

downloading the software program to the non-volatile memory while preventing access to the non-volatile memory by the processor.

18. The method of claim 14, comprising:

refraining from applying power to all but one of the sections to conduct the second executing.

19. The method of claim 14, wherein conducting the subsequent preliminary authentication comprises:

conducting the subsequent preliminary authentication prior to the second executing.

20. The method of claim 14, wherein conducting the subsequent preliminary authentication comprises:

conducting at least a portion of the subsequent preliminary authentication while a portion of the second executing occurs.

* * * * *

UNITED STATES PATENT AND TRADEMARK OFFICE

CERTIFICATE OF CORRECTION

PATENT NO. : 8,360,871 B2
APPLICATION NO. : 12/678990
DATED : January 29, 2013
INVENTOR(S) : Sylla et al.

It is certified that error appears in the above-identified patent and that said Letters Patent is hereby corrected as shown below:

On the Title Page, Item (56), in column 2, under “Other Publications”, line 1, after “PCT/US2008/010962”, insert --,--, therefor On Title page 2, in column 2, under “Other Publications”, line 1, after “PCT/US2008/010962”, insert --,--, therefor In the Specifications:

In column 2, line 15, delete “heat.” and insert --heat--, therefor

In column 2, line 42, delete “black jack” and insert --blackjack--, therefor

In column 5, line 5, delete “136"” and insert --136'''--, therefor

In column 5, line 11, delete “136"” and insert --136'''--, therefor

In column 5, line 55, delete “136"” and insert --136'''--, therefor

Signed and Sealed this
Fourth Day of June, 2013

Teresa Stanek Rea
*Acting Director of the United States Patent and Trademark Office*